Patented Dec. 19, 1922.

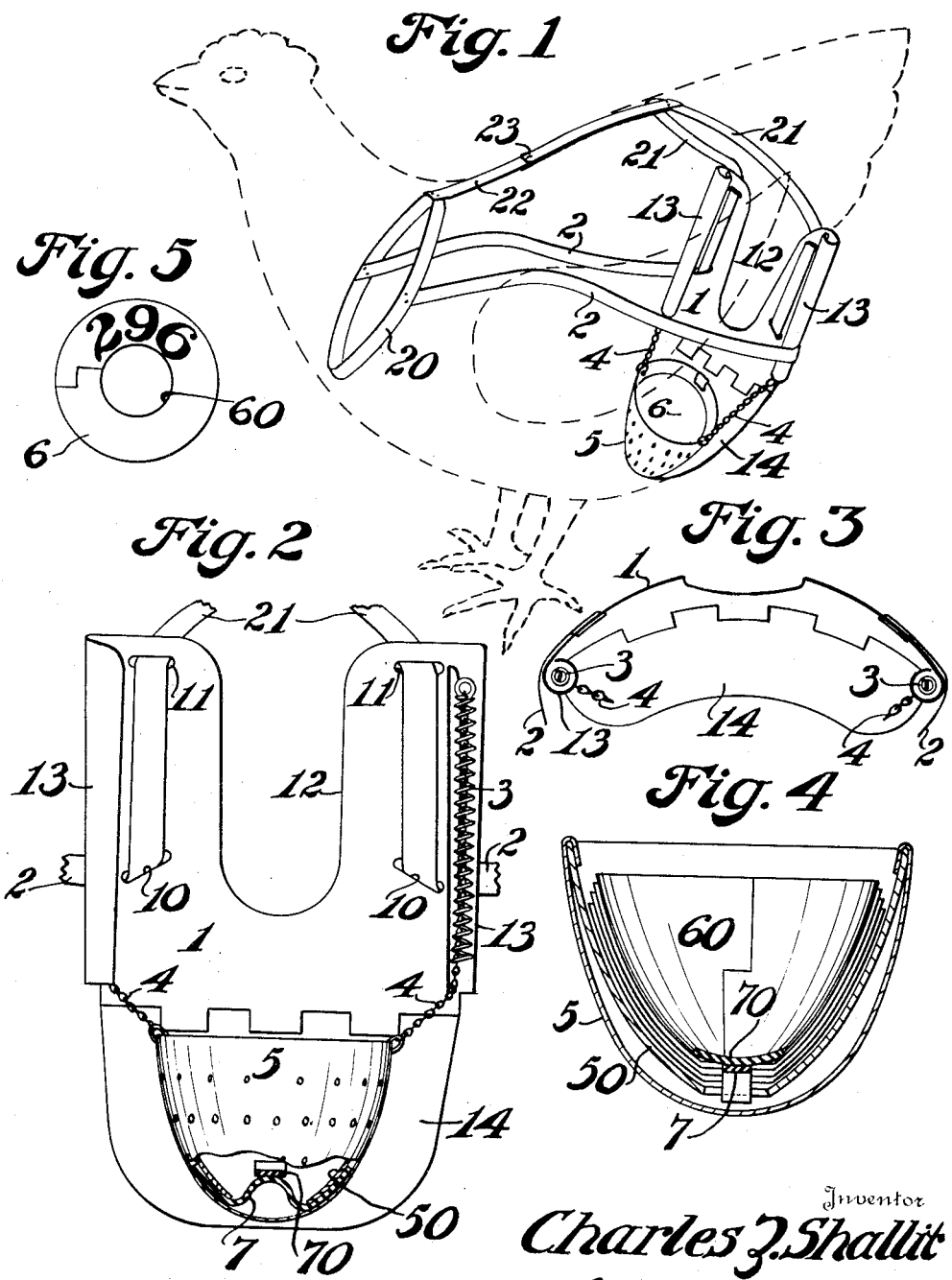

1,439,132

UNITED STATES PATENT OFFICE.

CHARLES Z. SHALLIT, OF SEATTLE, WASHINGTON.

EGG-LAYING INDICATOR.

Application filed February 14, 1922. Serial No. 536,546.

*To all whom it may concern:*

Be it known that CHARLES Z. SHALLIT, a citizen of the United States of America, and resident of the city of Seattle, in the county of King and State of Washington, have invented certain new and useful Improvements in Egg-Laying Indicators, of which the following is a specification.

My invention relates to devices which are designed for use in indicating or registering the eggs laid by hens.

The object of my invention is to provide a device which may be attached to a hen and which will operate to distinctively mark the eggs as laid so that the number of eggs which any hen lays may be determined and also the particular eggs laid by any hen. My device may, therefore, be termed an egg-register or indicator.

The features of my invention which I believe to be new and upon which I desire to secure a patent will be first described and then particularly pointed out in the claims terminating this specification.

The accompanying drawings indicate the manner in which I prefer to construct my device and the manner in which it is worn by the fowl.

Figure 1 shows my device in perspective, the manner of applying it to a fowl being indicated by the dotted line outline of the fowl.

Figure 2 is a front and upper view of the device with parts broken away to better illustrate its construction.

Figure 3 is a transverse section of the device through the main plate, showing the shape thereof.

Figure 4 is a section taken through the cup which holds the nested stickers which are designed to be applied to the egg as laid.

Figure 5 is an exterior view of one of the stickers showing the manner in which the same may be marked.

The idea of my device is to apply to the hen a frame or holder which is provided with means whereby it may carry a series of distinctively marked stickers, one of which stickers is applied to each egg as it is laid. In this manner the eggs as laid are each provided with a distinctive marking by which the hen which laid it may be determined. By the use of such a device, the use of such devices as trap nests by which the hens are retained in captivity after laying until released by hand, may be avoided, thus giving the hens full and complete liberty at all times. By the use of a device for distinctively marking the eggs the frequent visits of an attendant are also avoided, thus reducing the time required to secure information as to the laying hens.

This object is secured by securing to each hen a frame in position that the egg as laid will be brought into contact with a distinctively marked sticker. These stickers are provided with a gummed surface positioned to be engaged by the egg as laid and to have the gummed or sticker surface moistened by the natural moisture of the egg so as to secure the sticker thereto. This sticker may also have a surface which is affected by the natural heat of the egg so as to soften its adhesive surface and cause it to adhere to the egg. Either or both of these conditions may be made use of to secure the adhesion of the sticker thereto.

The frame consists chiefly of a plate 1 which is curved in transverse outline, as is clearly shown in Figure 3. This plate has straps or bands secured thereto by which it may be secured in position as desired. These straps or bands include a band 20 which is designed to be placed over the neck of the hen and to rest against the forward part of the body. Bands 2 secured to the band 20 at each side extend rearwardly over the part of the wing which is connected with the body and thence downward under the outer part of the wing and is secured to the plate 1 towards the lower end thereof. As illustrated this band or strap 2 passes through slots or openings 10 formed in the plate and thence upwardly and through the other slots 11 located near the upper end of the plate. The strap then extends as part 21 upwardly and over the back of the fowl. This upper portion of the band is secured as by means of a band 22 with the band 20 which passes about the neck of the fowl. One end of the band 22 may be secured to a buckle as 23 or any other suitable device by means of which the effective length of the band 22 may be adjusted. Suitable adjustments of a similar character may be provided in the band 2 if desired. In fact any and all parts of the harness by which the plate is secured in position may be made adjustable in length.

The plate 1 which forms the frame is provided with a central slot or opening as 12, extending downward from its upper end and positioned so as to secure free discharge of the droppings. The side vertical edges of the plate 1 are also rolled or curved over so as to form tubes or cylinders 13 in each of which is positioned a spring as 3. These springs are secured in the casing or tube thus formed at their lower ends. A chain or other flexible conductor as 4 is secured to the upper ends of the springs and by its lower end is secured to a cup 5 in which is placed a series of distinctively marked stickers. This cup 5 is normally held in raised position by the action of the springs 3. Its normal position is about as indicated in Figure 2, being somewhat below the opening 12. To the lower edge of the plate 1 may be secured an apron 14 of flexible material, such as cloth or leather. This would normally cover the cup 5 and materially protect it from dirt.

A sticker of a type which I prefer to use is shown separately in Figure 5. This may conveniently be made of paper as a frustum of a cone, that is, it has an opening 60 in its bottom and the inner or concave surface is given a coating of adhesive substance which may be softened by the moisture of a new laid egg, or one which is softened by the natural heat of the egg, either or both. Such stickers 6 may be nested together and placed within the cup 5.

Means are provided whereby the stickers may be held in such manner that they may be conveniently released one at a time for attachment to the egg. The cup 5 may preferably be provided with an inner lining 50 of paper or such material which is permanently secured in place. This lining 50 has secured thereto a sticker retaining device which consists of two flexible bars 7 and 70 which are centrally secured to each other in right angular relation. The inner of these cross bars has its ends passed under and secured to the outer surface of the lining 50 in such manner that the central portion thereof is bent upwardly and extends outwardly as a loop. This loop will thus pass through the central opening 60 of a series of nested stickers. The outer bar 70 thus extends outward sufficiently to slightly overlap the inner surface of the stickers and thus hold them in place. These two flexible bars 7 thus form a member which may be said to resemble a letter T, that is, the one 7 forms the stem of the T and the one 70 forms the top or head of the T, engaging the stickers to hold them in place.

The egg is of such size that when discharged it cannot pass through the slot or recess 12 of the plate 1. It therefore presses the plate outward slightly and is deflected downward into the cup 5. It enters this cup and contacts with the uppermost of the series of stickers which are nested therein.

The natural surface moisture of the egg together with its animal heat softens the adhesive surface of the sticker sufficiently to cause this sticker to adhere thereto. The egg will not be retained in the cup but will drop therefrom. The cup being supported by attachment at diametrically opposite points to the chains 4, is easily inverted. The egg will thus be left in the nest with the sticker attached thereto. The stickers are provided in series, each series having its distinctive mark as indicated in Figure 5. This mark may be a number, a letter, or a combination of numbers and letters or any other distinctive marking which it is desired to use and which has been found convenient. A record will be kept of the distinctive markings found upon the eggs in the nest and credit given to the hens to which these markings have been allotted. In this way the eggs laid by individual hens may be determined and a reliable egg record maintained.

What I claim as my invention is:

1. An egg-laying indicator comprising a holder for a series of egg markers and means for holding said holder upon the hen in position to apply a marker to the egg as laid.

2. An egg-laying indicator comprising means for supporting a sticker from the hen in position to be engaged by the egg as it is expelled from the hen.

3. An egg-laying indicator comprising a cup-like holder and means for supporting it from the hen in position to receive an egg when laid, and a sticker removably carried in said holder and adapted to be engaged by and secured to the egg as laid.

4. An egg-laying indicator comprising a holder for a series of egg markers and means for holding said markers for individual release and in position to be automatically attached to an egg as laid.

5. An egg-laying indicator comprising a cup of a size to receive an end of an egg, means for yieldingly supporting said cup to receive an egg as laid, and means for carrying distinctive egg markers in said cup.

6. An egg-laying indicator comprising a frame and means for securing it to the hen in position to be engaged by the egg as discharged, an egg receiving cup yieldingly supported by said frame to receive the egg, and means for securing a series of stickers in said cup and to permit their application to and individual removal by the egg as laid.

7. An egg-laying indicator comprising a frame and means for securing it to cover the egg discharge opening, said frame having an opening permitting passage of the droppings and of insufficient size to permit passage of an egg, and means for distinctively marking the egg carried by the frame beneath said opening.

8. An egg-laying indicator comprising a frame and means for securing it to cover the egg discharge opening, said frame having an opening permitting passage of the droppings and of insufficient size to permit passage of an egg, an egg receiving cup, resilient means supporting said cup below said opening and distinctly marked stickers carried in said cup and adapted to be separately removed with the eggs.

9. In an egg-laying indicator, a distinctively marked sticker having an adhesive coated inner surface and means for supporting said sticker in position to receive the egg therein as laid.

10. An egg-laying indicator comprising distinctively marked stickers and means for supporting a series thereof for individual removal and in position to be engaged by the egg as laid.

11. In an egg-laying indicator, a cup, and means for supporting it from a hen in position to receive the end of the egg as laid, a series of distinctively marked cup-like stickers having a bottom opening and adapted to be nested in said cup, and a centrally supported flexible cross bar at the bottom of said cup adapted to be passed through the holes in the bottom of the stickers to engage their inner surfaces to hold them yieldingly in place.

12. In an egg-laying indicator, a plate adapted to be secured behind and beneath a hen to cover the vent area, said plate having a central slot extending from its upper end downwardly and adapted to pass the droppings and to prevent passage of an egg, the outer side edges of said plate having spring receiving tubes, springs in said tubes, an egg receiving cup suspended from said springs between the plate and the hen and distinctively marked stickers releasably held in said cup and adapted to be stuck upon and removed by the egg as laid.

Signed at Seattle, King County, Washington this 9th day of February, 1922.

CHARLES Z. SHALLIT.